(12) United States Patent
Sund et al.

(10) Patent No.: US 6,655,695 B1
(45) Date of Patent: Dec. 2, 2003

(54) FACE SEAL ASSEMBLY WITH COMPOSITE ROTOR

(75) Inventors: Steven E. Sund, Ogdensburg, NJ (US); Charles J. Gasdaska, Sparta, NJ (US); James V. Guiheen, Madison, NJ (US); Lennox Bruce, West Orange, NJ (US); M. Rifat Ullah, Tempe, AZ (US); William L. Giesler, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 150 days.

(21) Appl. No.: 09/782,865

(22) Filed: Feb. 13, 2001

(51) Int. Cl.[7] .................................................. F16J 15/34
(52) U.S. Cl. ........................ 277/404; 277/358; 277/360; 277/399; 277/405
(58) Field of Search ................................ 277/404, 358, 277/359, 360, 370, 399, 405

(56) References Cited

U.S. PATENT DOCUMENTS

| | | |
|---|---|---|
| 2,785,913 A | 3/1957 | Solari |
| 3,048,413 A | 8/1962 | Wood |
| 3,810,637 A | 5/1974 | Bonvin |
| 4,093,243 A | 6/1978 | Kishida et al. |
| 4,391,450 A | 7/1983 | Beck |
| 4,451,048 A | 5/1984 | Pick |
| 4,723,862 A | 2/1988 | Ito et al. |
| 4,772,294 A * | 9/1988 | Schroeder |
| 4,865,333 A | 9/1989 | Winslow |
| 4,984,927 A | 1/1991 | Kojima et al. |
| 5,108,025 A * | 4/1992 | Kang et al. |
| 5,113,052 A | 5/1992 | Gabriel |
| 5,183,270 A | 2/1993 | Alten et al. |
| 5,186,380 A | 2/1993 | Beeferman et al. |
| 5,234,152 A | 8/1993 | Glaeser |
| 5,372,298 A | 12/1994 | Glaeser |
| 5,407,119 A * | 4/1995 | Churchill et al. |
| 5,544,896 A | 8/1996 | Draskovich et al. |
| 5,626,347 A | 5/1997 | Ullah |
| 5,897,118 A | 4/1999 | Ito et al. |
| 6,113,109 A | 9/2000 | Lieb et al. |
| 6,131,797 A * | 10/2000 | Gasdaska et al. |
| 6,450,762 B1 * | 9/2002 | Munshi ...................... 415/138 |

FOREIGN PATENT DOCUMENTS

| | | |
|---|---|---|
| DE | 39 25 403 A1 | 1/1991 |
| GB | 112165 | 3/1975 |
| WO | WO 02/04383 | 1/2002 |

* cited by examiner

Primary Examiner—Anthony Knight
Assistant Examiner—Enoch E Peavey
(74) Attorney, Agent, or Firm—Robert Desmond, Esq.

(57) ABSTRACT

A composite face seal having an annular seal rotor with a metal base portion and a radially extending flange. The flange having first and second axially facing surfaces. A first ceramic ring is mounted to the first surface of the flange by a first braze joint and a second ceramic ring is mounted to the second surface of the flange by a second braze joint. The composite face seal assembly further includes an annular stator having an axially facing surface that sealingly engages an axially facing surface of one of the ceramic rings. Each of the braze joints may comprise a molybdenum ring disposed between two braze rings or, for thicker seal assemblies, molybdenum and nickel rings disposed between braze rings.

46 Claims, 5 Drawing Sheets

FACE SEAL ASSEMBLY WITH COMPOSITE ROTOR

TECHNICAL FIELD

This invention relates generally to face seal assemblies comprised of a rotating seal rotor and a stationary face seal for sealing along the rotating shaft of a gas turbine engine, and in particular, to an improved composite seal rotor having a metal portion and a ceramic portion.

BACKGROUND OF THE INVENTION

Face seal assemblies are employed in gas turbine engines to prevent leakage of fluid along the engine's rotating shaft where the shaft extends through a wall or partition. These assemblies are comprised of a rotating component called a seal rotor and a non-rotating component called a seal stator. The seal stator is usually lightly spring loaded against the seal rotor.

Historically, various materials have been used for both the seal rotor and seal stator. For example, metals, carbon, ceramics, and other materials are mentioned in Zobens, U.S. Pat. No. 4,174,844, Floyd et al., U.S. Pat. No. 4,036,505, Fenerty et al., U.S. Pat. No. 3,926,443, and Stahl, U.S. Pat. No. 3,770,181. A common configuration is to have a metallic seal rotor and a carbon or graphite stator. A problem with these seals is that oil coking results from the friction between the seal rotor and the seal stator. Also, the carbon or graphite face seal tends to wear which requires that the engine be removed from service regularly to either inspect or replace the seal.

It is well known by those skilled in the art, that a carbon or graphite seal stator will wear at a lower rate when rubbing against a ceramic surface as opposed to a metallic surface. Accordingly, one proposal for increasing the life of a conventional face seal assembly is to replace the metallic seal rotor with a ceramic seal rotor, (see for example Fenerty et al., teaching a seal assembly for a water pump in which one of the seal rings is ceramic, column 1, lines 50–55). However, such technology is not applicable to gas turbine engines because the rotating components in these engines are assembled in a lockup. This means that the rotating components, (e.g., the compressor disks and turbine disks including the seal rotors) are first stacked one atop the other and then forced, and held together by a large compressive force. This compressive force produces concentrated tensile stresses on the sealing surfaces of the seal rotors abutting a rotating component. Because of its brittle nature conventional ceramic seal rotors tend to crack under these conditions.

To overcome the disadvantages associated with ceramic rotors while maintaining their benefits, Alten, U.S. Pat. No. 5,183,270, which is assigned to the assignee of this application, discloses a composite seal rotor having an inner metal ring for transmitting compressive forces and an outer ceramic ring for sealingly engaging the carbon face seal. A number of challenges were faced in designing this composite ceramic/metal seal assembly. First, the sealing surfaces must remain extremely flat over a typical operating temperature range of −65 to 400° F. This presents a problem for a composite seal rotor because the various materials combined in the composite have differing thermal expansion behavior that leads to distortion of the assembly during temperature changes. This distortion is sometimes referred to as coning. Second, the mechanism used to hold the metal and ceramic components together must provide sufficient adherence at all temperatures and hold the components together at rotational speeds ranging between 35,000 and 160,000 RPM.

Gasdaska et al., U.S. Pat. No. 6,131,797, which is assigned to the assignee of this application, discloses a novel brazing method for attaching a metal part to a ceramic part. In particular, this patent discloses a braze joint that includes a layer of bar stock type molybdenum between first and second layers of ductile material. The first ductile layer being brazed to the metal and the second ductile layer being brazed to the ceramic. When the Gasdaska method is used in the formation of a face seal, the seal rotor ends up having seven layers (braze-nickel-braze-molybdenum-braze-nickel-braze) between the metal and ceramic. In many areas of gas turbine engines where face seals are employed, very little space is available making it difficult to use the multilayer design of the Gasdaska patent.

Accordingly, a need still exists for a composite face seal assembly that can be used in the small spaces typically found in gas turbine engines.

SUMMARY OF THE INVENTION

An object of the present invention is to provide a composite face seal assembly that can be used in the small spaces normally found in gas turbine engines. Typically, when the ratio of the thickness of the joined members relative to the largest dimension of the joined members in the plane of the joint is less than ¼, the present invention is applicable.

The present invention meets this objective by providing a composite face seal comprising an annular seal rotor having a metal base portion and a radially extending flange with first and second axially facing surfaces. A first ring, which may be ceramic, is mounted to the first surface of the flange by a first braze joint and a second ring, which may be ceramic, is mounted to the second surface of the flange by a second braze joint. The composite face assembly further includes an annular stator having an axially facing surface that sealingly engages an axially facing surface of one of the ceramic rings.

In one embodiment of the present invention, each of the braze joints may comprise a molybdenum ring disposed between two braze rings. This embodiment of the seals is particularly suitable for applications where space limits the axial dimension of the seal to a range of between 0.120 and 0.170 inches.

A second embodiment of the present invention may have an additional nickel ring disposed between the molybdenum ring and the base metal with braze rings between the nickel and the base metal. This embodiment of the seal can be used in applications where the axial dimension of the seal can be in the range of 0.170 to 0.220 inches.

A seal rotor is also disclosed. The seal rotor has a metal base portion and a radially extending flange with first and second axially facing surfaces. A first ring, which may be ceramic, is mounted to the first surface of the flange by a first braze joint and a second ring, which may be ceramic, is mounted to the second surface of the flange by a second braze joint.

In one embodiment of this invention, each of the braze joints may comprise a molybdenum ring disposed between two braze rings. This embodiment of the rotor is particularly suitable for applications where space limits the axial dimension of the rotor to a range of between 0.120 and 0.170 inches.

A second embodiment of this invention may have an additional nickel ring disposed between the molybdenum ring and the base metal with braze rings between the nickel and the base metal. This embodiment of the seal can be used in applications where the axial dimension of the rotor can be in the range of 0.170 to 0.220 inches.

These and other objects, features and advantages of the present invention are specifically set forth in or will become apparent from the following detailed description of the preferred embodiments of the invention when read in conjunction with the accompanying drawings.

DESCRIPTION OF THE PREFERRED EMBODIMENTS

Gasdaska, U.S. Pat. No. 6,131,797 is incorporated herein by reference.

Figure 1:
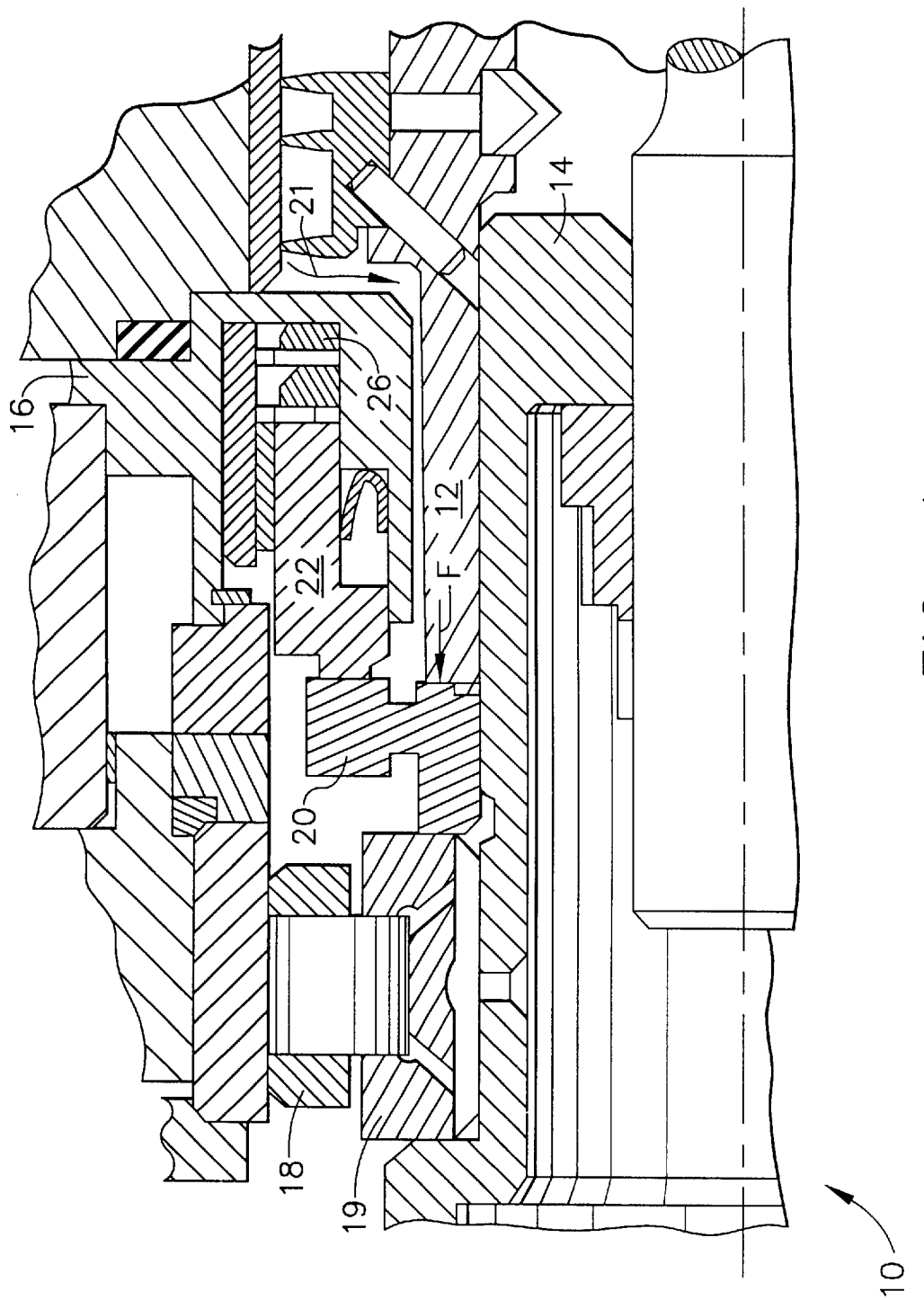
FIG. 1 is a cross-sectional view of a portion of a gas turbine engine having a prior art face seal assembly.

Referring to the drawings, FIG. 1 shows a compressor section of a gas turbine engine generally denoted by the reference numeral 10. The section 10 has a rotating compressor disk 12 coupled to a rotating shaft 14. Circumscribing the shaft 14 is a stationary housing 16. The housing 16 is mounted atop a bearing 18 having an inner race 19 which is mounted on the shaft 14. A prior art metallic seal rotor 20 is mounted for rotation on the shaft 14 and has a base portion that abuts at one axial end with the inner race 19 and at the other axial end with the compressor disk 12. A portion of the housing 16 circumscribes a portion of the compressor disk 12 defining a leakage path, (referenced by arrow 21) therebetween. Mounted within the housing 16 is a nonrotating carbon or graphite seal stator 22 that is positioned to abut an upper portion of the seal rotor 20 sealing the leakage path 21. A spring 26 forces the stator 22 into sealing engagement with the upper portion of the rotor seal 20. Because of the lockup assembly of the engine containing the compressor section 10, a compressive force, represented by arrow F, of about 30,000 lbs., is transmitted from the compressor disk 12, through the base portion of the seal rotor 20, to the inner race 19.

Figure 2:
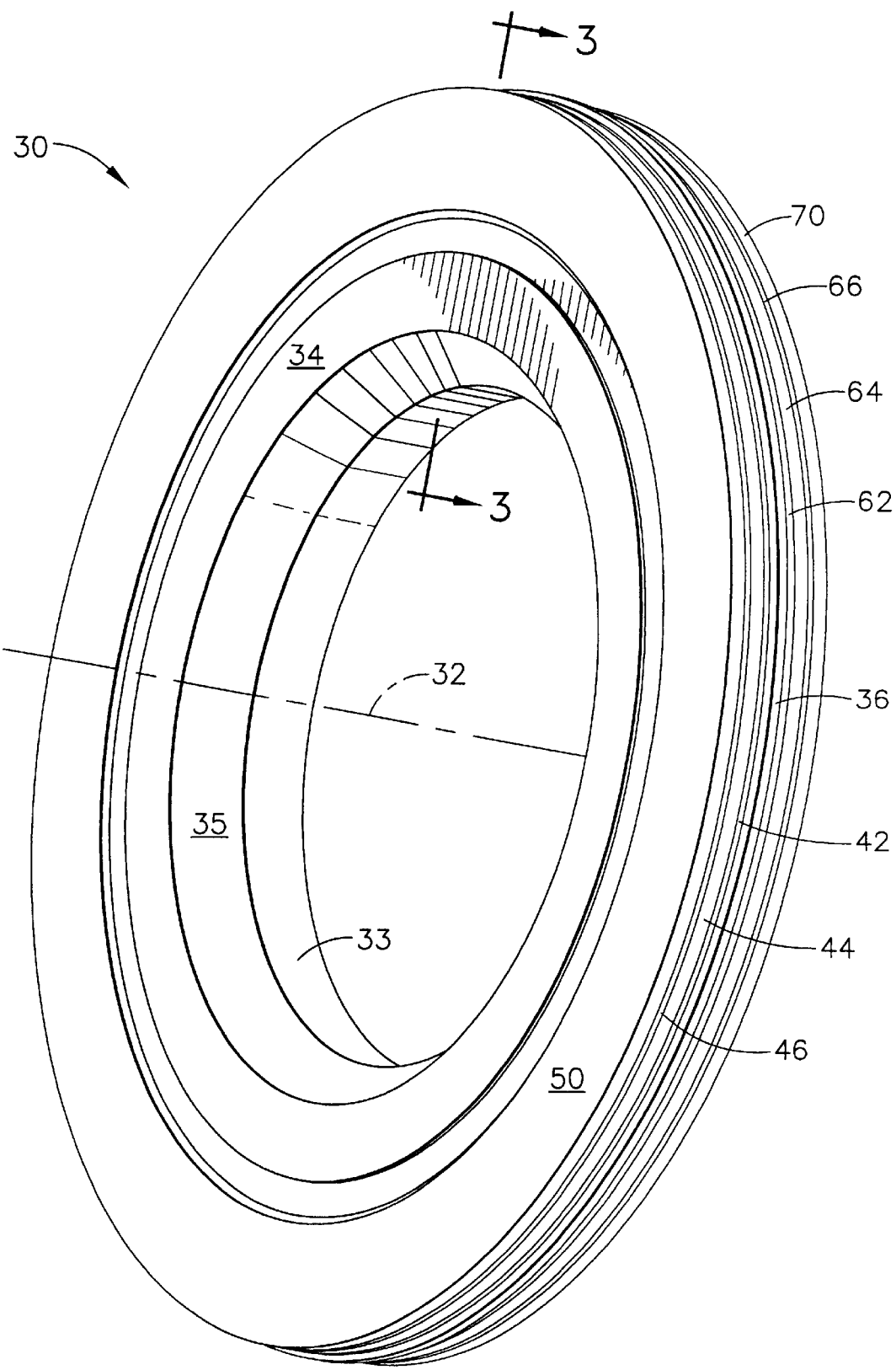
FIG. 2 is a perspective view of a composite seal rotor contemplated by the present invention.
Figure 3:
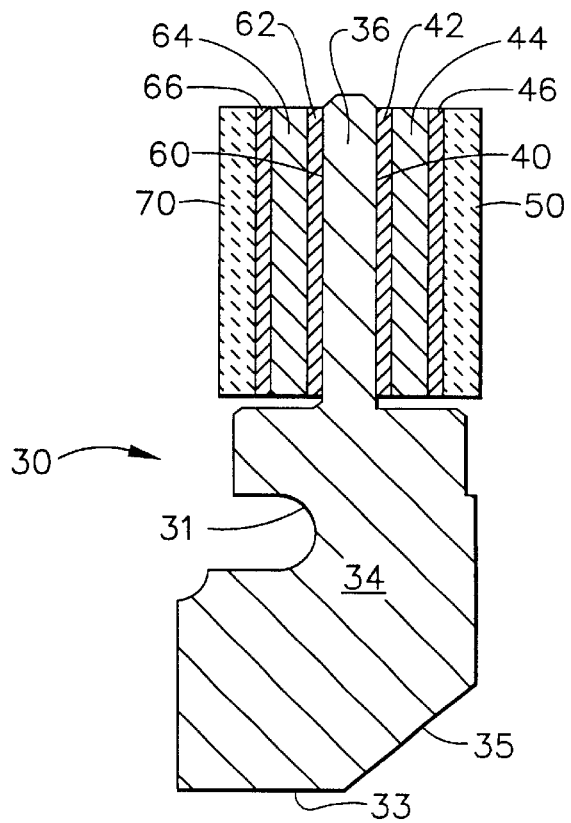
FIG. 3 is a cross-sectional view along line 3—3 of the composite seal rotor of FIG. 2.

Referring to FIGS. 2 and 3, a composite seal rotor is generally denoted by reference numeral 30. The seal rotor 30 is annular and is symmetric about a centerline 32. When mounted in an engine, the centerline 32 is coincident with the centerline of the engine. The seal rotor 30 has a metal base portion 34 having a radially extending flange 36. The base portion 34 has an inner surface 33 that engages the shaft 14. It also has a slanted surface 35 as well as at least one conventional stress relieving slot 31. The flange 36 has axially facing surfaces 40, 60 that face in opposite directions. A ceramic ring 50 is mounted to the surface 40 by a braze joint comprised of a first braze ring 42, a molybdenum ring 44 and a second braze ring 46. Likewise, a ceramic ring 70 is mounted to the surface 60 by a braze joint comprised of a third braze ring 62, a molybdenum ring 64 and a fourth braze ring 66. The molybdenum rings 44, 64 are preferably machined from molybdenum bar stock, such as that corresponding to ASTM B387-90. Bar stock molybdenum, which is extruded, has crystals that are elongated in a preferred orientation. Thus, the molybdenum rings 44, 64 have crystalline microstructure orientated perpendicular to the surfaces 40 and 60. Such an orientation minimizes the stress caused by bending and twisting at the crystal boundaries in the molybdenum rings 44, 64. This reduces the chances of separation (cracking) of the molybdenum due to twisting and bending of the assembly. The ceramic rings 50 and 70 are preferably silicon nitride, $Si_3N_4$. Other ceramics that can be used are reaction bonded and sintered silicon carbide, SiC, reaction bonded and sintered tungsten carbide, WC, and beryllium oxide, BeO. Also, single isotope ceramics such as silicon 28 may be used. Additional applicable ceramics are kennametal®, aluminum titanate, zirconia, cobalt oxide, enstatite, fosterite, nickel oxide, alumina, zirconium silicate, titanium diboride, boron nitride, aluminum nitride, ceramic eutectic composites, ceramic matrix composites, and metal matrix composites.

The base portion 34 is preferably made of a standard metal such as SAE 4340 steel. Alternatively, the base portion 34 may be made from molybdenum or titanium such as Ti-6-4 or any other metal suitable under a given set of service conditions.

Each of the braze rings 42, 46, 62, 66 is a silver and copper braze foil and may also include an active metal such as titanium. For example, the titanium may be coated onto a silver-copper braze foil. The preferred composition of the braze foil is silver in the range of 62 to 71% weight of the composition, copper in the range of 26.3 to 36% weight of the composition, and titanium in the range of 1.5 to 6.0% weight of the composition. Some standard silver-copper braze foils that can be used in the preferred embodiment are BVAg 8 or AWS 5.8 each coated with or containing titanium. The thickness of each of the braze rings 42, 46, 62, 66 should preferably be in the range of 0.004 to 0.006 inch. Further, the thickness of each of the ceramic rings 50 and 70 should be greater than or equal to 0.018 inch. In the preferred embodiment, thickness of molybdenum rings 44, 64 should be close to the thickness of the ceramic rings 50, 70. The seal rotor 30 can be assembled using conventional brazing techniques.

Figure 4:
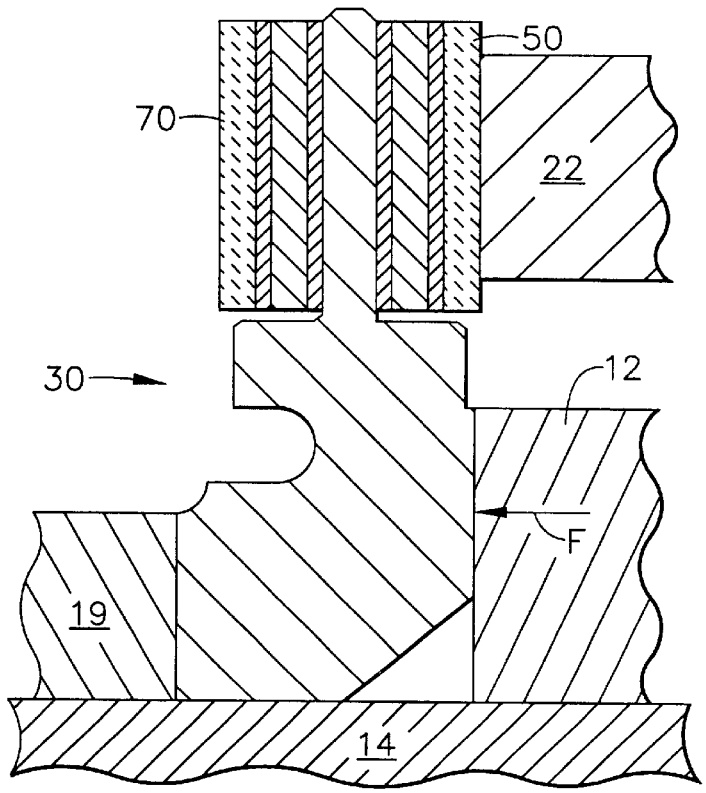
FIG. 4 is a plan cross-sectional view of a face seal assembly mounted in an engine having the composite seal rotor of FIG. 3.

FIG. 4 shows the seal rotor 30 mounted in a gas turbine engine to form a face seal. An axially facing surface of the ceramic ring 50 sealingly engages the seal stator 22. The other ceramic ring 70 is not used for sealing but assures that the seal rotor 30 is properly balanced. The Applicants have found that removing material from the outside diameter of the ceramic rings only will reduce the stresses in the ceramic rings. This configuration also gives a flatter ceramic surface along with lower overall displacement and less end effect bending of the ceramic.

Figure 7:
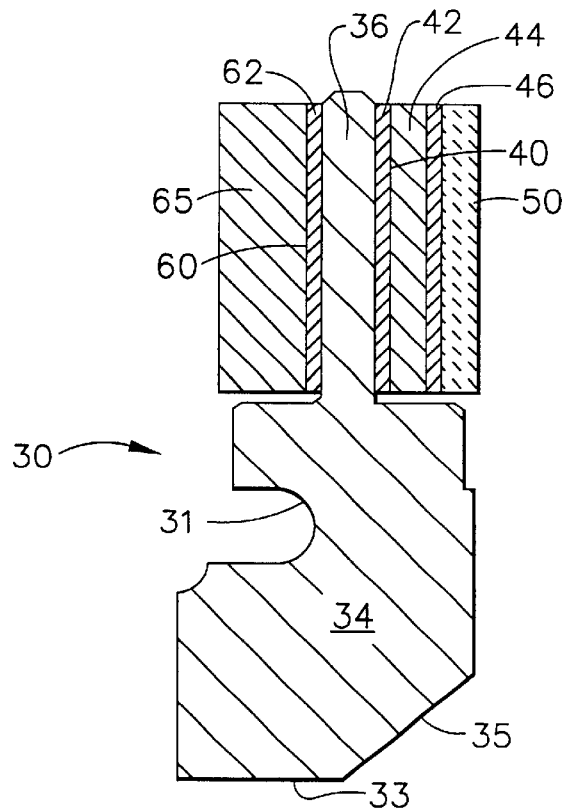
FIG. 7 is a cross-sectional view of an alternative embodiment of the composite seal rotor of FIG. 3.

Alternatively, FIG. 7 shows that the non sealing ceramic ring 70 which is not used for sealing purposes along with the enclosed braze layer 66 and molybdenum 64, may be replaced by a low expansion metal 65 such as molybdenum to balance the thermal stresses. This low expansion metal 65 is brazed to the flange 36 by the braze layer 62. This configuration is particularly applicable for low rpm applications.

The seal rotor 30, as just described, is particularly applicable to applications where space limits the axial dimension of the seal rotor to a range of 0.12 to 0.17 inches. Where more space is available and this range can grow to be between 0.17 to 0.22 inches, an alternative embodiment of the seal rotor 30 may be used.

Figure 5:
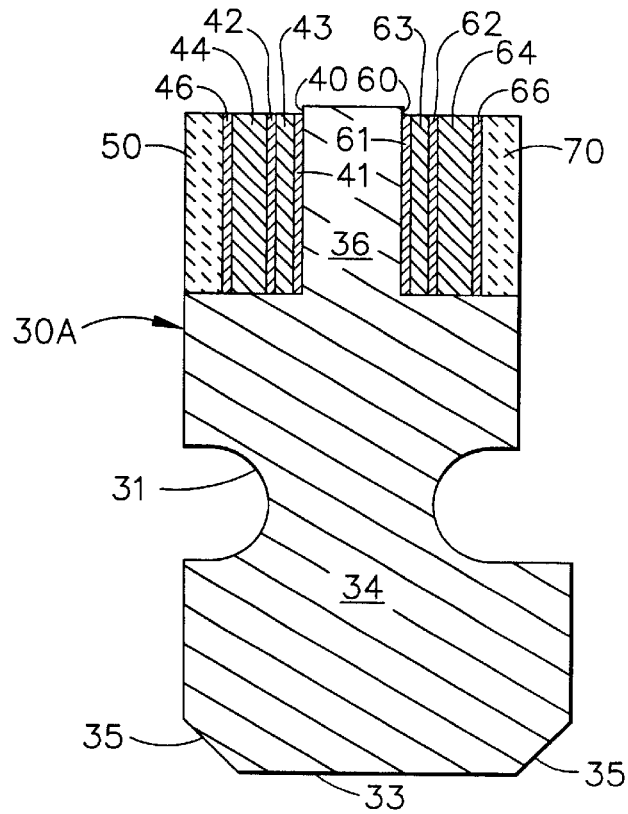
FIG. 5 is a cross-sectional view of an alternative embodiment of the composite seal rotor of FIG. 2.
Figure 6:
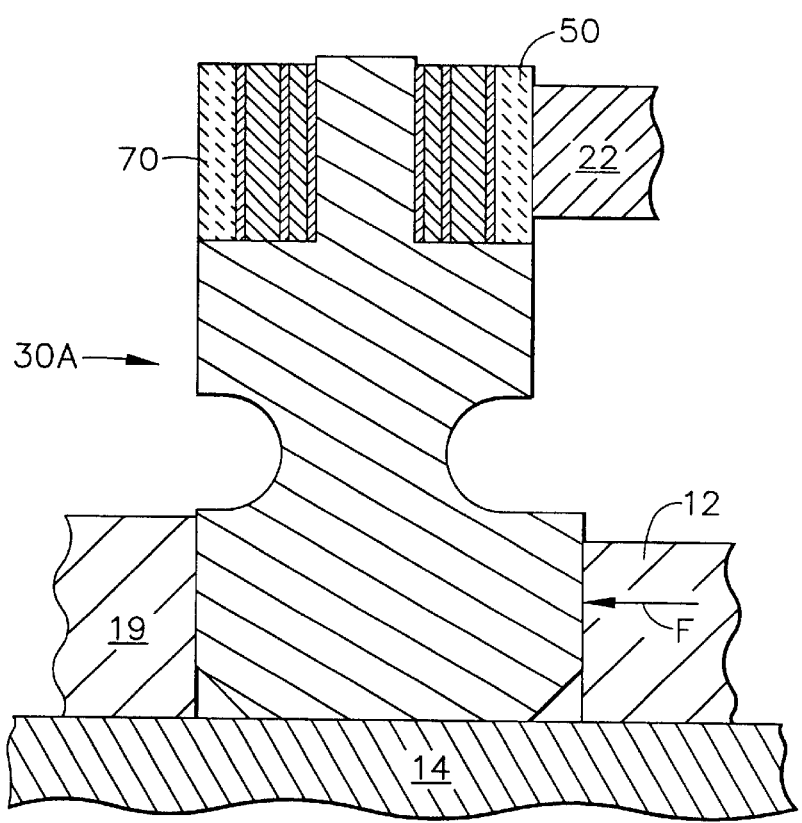
FIG. 6 is a plan cross-sectional view of a face seal assembly mounted in an engine having the composite seal rotor of FIG. 5.

The alternative embodiment seal rotor 30A is shown in FIGS. 5 and 6. Like reference numerals between FIGS. 2–6 refer to like structures. The seal rotor 30A is identical to seal rotor 30 except it additionally has a braze ring 41 and a nickel ring 43 between the surface 40 and the first braze ring 42 and also a braze ring 61 and a nickel ring 63 between the surface 60 and the third braze ring 62.

The composition and thickness of the braze rings 41 and 61 are identical to that of the other braze rings 42, 46, 62, 66. The seal rotor 30A is assembled using conventional brazing techniques.

Figure 8:
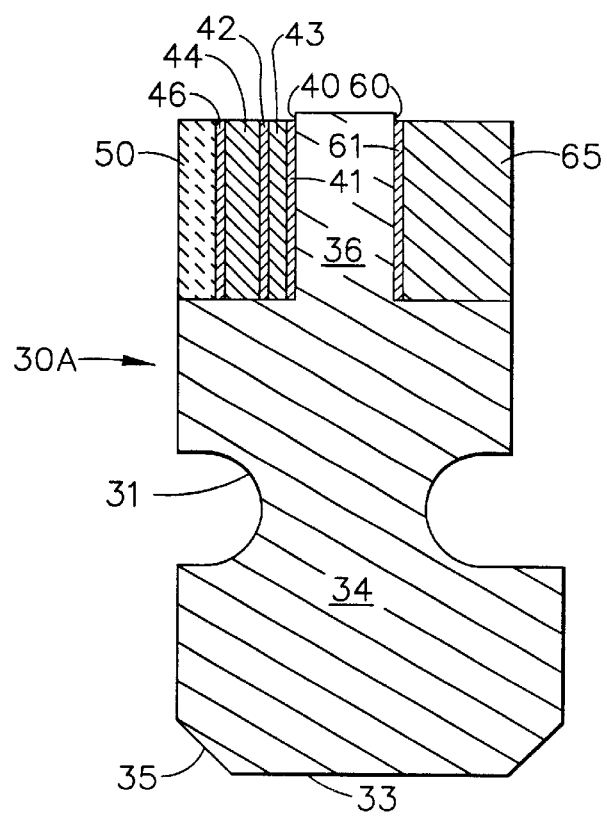
FIG. 8 is a cross-sectional view of an alternative embodiment of the composite seal rotor of FIG. 5.

FIG. 6 shows the seal rotor 30A mounted in a gas turbine engine to form a face seal. An axially facing surface of the ceramic ring 50 sealingly engages the seal stator 22. The other ceramic ring 70 is not used for sealing but assures that the seal rotor 30A is properly balanced. Alternatively, FIG. 8 shows that the ceramic ring 70, which is not used for sealing purposes, along with the enclosed brazes 62, 66, molybdenum 64 and nickel 63 may be replaced by a low expansion metal 65 such as molybdenum to balance the thermal stresses. This low expansion metal 65 is brazed to the flange 36 by the braze layer 61.

EXAMPLE 1

A computer model of the seal 30 was created with the seal having an inner diameter of 0.677 inch, and outer diameter of 1.58 inch and a total thickness of 0.13 inch. Allowing a minimum of 0.034 inches for the flange 36, only 0.048 inches is available for the braze assembly on each side of the flange 36. The ratio of the thickness of the ceramic ring to the molybdenum ring should be as close to 1 as possible and the ceramic ring minimum thickness should be greater than or equal to 0.018 inches. The model indicated a residual tensile stress of 57 Ksi whereas a ceramic/nickel/molybdenum/metal configuration had a residual tensile stress of 104 Ksi. The first configuration is better since the ceramic is a brittle material and the lower stresses of 67 Ksi has a much lower probability of failure.

EXAMPLE 2

A computer model of the seal 30A was created with the seal having an inner diameter of 1.38 inch, an outer diameter of 2.13 inch and a total thickness of 0.19 inch. Of the total thickness of 0.19 inch, 0.060 inch is required for the flange 36. This leaves only 0.065 inches for the ceramic and interlayer assembly on each side. The preferred thicknesses are 0.020 inch for the ceramic rings, 0.005 inch for the braze rings, 0.020 inch for the molybdenum ring and 0.010 inch for the nickel rings. The ratio of molybdenum ring thickness to the nickel ring thickness should be in the range 1.5/1 to 2.0/1 and the ceramic minimum thickness should be greater than or equal to 0.018 inch. In the preferred embodiment, the ceramic to molybdenum ratio should be as close to 1 as possible. This configuration gives a residual stress in the ceramic rings of 46 ksi. In contrast, an arrangement in which the position of the nickel and molybdenum rings are switched results in a residual stress of 93 ksi in the ceramic rings. This latter stress level is unacceptable as it will lead to a failure of the ceramic ring. Using the interlayer disclosed in U.S. Pat. No. 6,131,797 results in a residual stress of 92 ksi in the ceramic rings also an unacceptable stress level. Again the first configuration is better since the ceramic is a brittle material and the lower stresses of 46 Ksi has a much lower probability of failure.

Various modifications and alterations of the above described embodiments will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A face seal assembly for sealing between rotating components of a gas turbine engine mounted on a rotating shaft and a housing circumscribing the rotating components comprising:
   an annular seal rotor adapted for mounting to the shaft, the seal rotor having
      a metal base portion having a radially extending flange with first and second axially facing surfaces,
      a first ring mounted to the first axially facing surface of the flange by a first braze joint, and
      a second ring mounted to the second axially facing surface of the flange by a second braze joint; and
   an annular stator adapted for mounting to the housing and having an axially facing surface that sealingly engages an axially facing surface of the first ring.

2. The assembly of claim 1 wherein each of the braze joints comprises a molybdenum ring disposed between two braze rings.

3. The assembly of claim 2 wherein the molybdenum rings are formed from molybdenum bar stock.

4. The assembly of claim 2 wherein the molybdenum rings have a crystalline microstructure orientated perpendicular to the first and second axially facing surfaces of the flange.

5. The assembly of claim 2 wherein each of the braze rings is a silver and copper braze foil.

6. The assembly of claim 5 wherein each of the foils has titanium.

7. The assembly of claim 6 wherein each of the foils comprises silver in the range of 62 to 71% weight, copper in the range of 26.3 to 36% weight and titanium in the range of 1.5 to 6.0% weight.

8. The assembly of claim 1 wherein both first and second rings are formed from a ceramic.

9. The assembly of claim 8 wherein the ceramic is silicon nitride.

10. The assembly of claim 1 wherein said first ring is formed from a ceramic and said second ring is formed from low expansion metal.

11. The assembly of claim 10 wherein said first braze joint comprises a first braze ring coupled to said metal base, a first metal ring coupled to said first braze ring, and a second braze ring coupled to said first metal ring and said ceramic first ring.

12. The assembly of claim 11 wherein said second braze joint comprises a third braze ring coupled to said metal base.

13. A seal rotor for use in a face seal assembly for sealing between rotating components of a gas turbine engine mounted on a rotating shaft and a housing circumscribing the rotating components comprising:
   a metal base portion having a radially extending flange with first and second axially facing surfaces;
   a first ring mounted to the first axially facing surface of the flange by a first braze joint; and
   a second ring mounted to the second axially facing surface of the flange by a second braze joint.

14. The assembly of claim 13 wherein each of the braze joints comprises a molybdenum ring disposed between two braze rings.

15. The assembly of claim 14 wherein the molybdenum rings are formed from molybdenum bar stock.

16. The assembly of claim 14 wherein the molybdenum rings have a crystalline microstructure orientated perpendicular to the first and second axially facing surfaces of the flange.

17. The assembly of claim 14 wherein each of the braze rings is a silver and copper braze foil.

18. The assembly of claim 17 wherein each of the foils has titanium.

19. The assembly of claim 18 wherein each of the foils comprises silver in the range of 62 to 71% weight, copper in the range of 26.3 to 36% weight and titanium in the range of 1.5 to 6.0% weight.

20. The assembly of claim 13 wherein both first and second rings are formed from a ceramic.

21. The assembly of claim 20 wherein the ceramic is silicon nitride.

22. The assembly of claim 13 wherein the first ring is formed from a ceramic and the second ring is formed from low expansion metal.

23. The assembly of claim 22 wherein said first braze joint comprises a first braze ring coupled to said metal base, a first metal ring coupled to said first braze ring, and a second braze ring coupled to said first metal ring and said ceramic first ring.

24. The assembly of claim 23 wherein said second braze joint comprises a third braze ring coupled to said metal base.

25. A face seal assembly for sealing between rotating components of a gas turbine engine mounted on a rotating shaft and a housing circumscribing the rotating components comprising:
    an annular seal rotor adapted for mounting to the shaft, the seal rotor having
        a metal base portion having a radially extending flange with first and second axially facing surfaces,
        a first braze ring coupling the first axially facing surface of the flange to a first nickel ring,
        a second braze ring coupling the first nickel ring to a first molybdenum ring,
        a third braze ring coupling the first molybdenum ring to a first sealing ring,
        a fourth braze ring coupling the second axially facing surface of the flange to a second nickel ring,
        a fifth braze ring coupling the second nickel ring to a second molybdenum ring, and
        a sixth braze ring coupling the second molybdenum ring to a second sealing ring; and
    an annular stator adapted for mounting to the housing and having an axially facing surface that sealingly engages an axially facing surface of the first sealing ring.

26. The assembly of claim 25 wherein the molybdenum rings are formed from molybdenum bar stock.

27. The assembly of claim 25 wherein the molybdenum rings have a crystalline microstructure orientated perpendicular to the first and second axially facing surfaces of the flange.

28. The assembly of claim 25 wherein each of the braze rings is a silver and copper braze foil.

29. The assembly of claim 28 wherein each of the foils has titanium.

30. The assembly of claim 29 wherein each of the foils comprises silver in the range of 62 to 71% weight, copper in the range of 26.3 to 36% weight and titanium in the range of 1.5 to 6.0% weight.

31. The assembly of claim 25 wherein both first and second sealing rings are formed from a ceramic.

32. The assembly of claim 31 wherein the ceramic is silicon nitride.

33. The assembly of claim 25 wherein the first sealing ring is formed from a ceramic and the second sealing ring is formed from low expansion metal.

34. The assembly of claim 33 wherein said second sealing ring replaces said second nickel ring, said fifth braze ring, said second molybdemun ring and said sixth braze ring, said second sealing ring coupled to said fourth braze ring.

35. A face seal assembly for sealing between rotating components of a gas turbine engine mounted on a rotating shaft and a housing circumscribing the rotating components comprising:
    an annular seal rotor adapted for mounting to the shaft, the seal rotor having
        a metal base portion having a radially extending flange with first and second axially facing surfaces,
        a first braze ring coupling the first axially facing surface of the flange to a first nickel ring,
        a second braze ring coupling the first nickel ring to a first molybdenum ring,
        a third braze ring coupling the first molybdenum ring to a first sealing ring, the first sealing ring formed from a ceramic,
        a fourth braze ring coupling the second axially facing surface of the flange to a second sealing ring, said second sealing ring is formed from low expansion metal and balancing at least said first sealing ring, and
    an annular stator adapted for mounting to the housing and having an axially facing surface that sealingly engages an axially facing surface of the first sealing ring.

36. A seal rotor for use in a face seal assembly for sealing between rotating components of a gas turbine engine mounted on a rotating shaft and a housing circumscribing the rotating components comprising:
    a metal base portion having a radially extending flange with first and second axially facing surfaces;
    a first braze ring coupling the first axially facing surface of the flange to a first nickel ring;
    a second braze ring coupling the first nickel ring to a first molybdenum ring;
    a third braze ring coupling the first molybdenum ring to a first sealing ring;
    a fourth braze ring coupling the second axially facing surface of the flange to a second nickel ring;
    a fifth braze ring coupling the second nickel ring to a second molybdenum ring; and
    a sixth braze ring coupling the second molybdenum ring to the second sealing ring.

37. The assembly of claim 36 wherein the molybdenum rings are formed from molybdenum bar stock.

38. The assembly of claim 36 wherein the molybdenum rings have a crystalline microstructure orientated perpendicular to the first and second axially facing surfaces.

39. The assembly of claim 36 wherein each of the braze rings is a silver and copper braze foil.

40. The assembly of claim 39 wherein each of the foils has titanium.

41. The assembly of claim 40 wherein each of the foils comprises silver in the range of 62 to 71% weight, copper in the range of 26.3 to 36% weight and titanium in the range of 1.5 to 6.0% weight.

42. The assembly of claim 36 wherein both first and second sealing rings are formed from a ceramic.

43. The assembly of claim 42 wherein the ceramic is silicon nitride.

44. The assembly of claim 36 wherein the first sealing ring is formed from a ceramic and the second sealing ring is formed from low expansion metal.

45. The assembly of claim 44 wherein said second sealing ring replaces said second nickel ring, said fifth braze ring, said second molybdemun ring and said sixth braze ring, said second sealing ring coupled to said fourth braze ring.

46. A seal rotor for use in a face seal assembly for sealing between rotating components of a gas turbine engine mounted on a rotating shaft and a housing circumscribing the rotating components comprising:

a metal base portion having a radially extending flange with first and second axially facing surfaces;

a first braze ring coupling the first axially facing surface of the flange to a first nickel ring;

a second braze ring coupling the first nickel ring to a first molybdenum ring;

a third braze ring coupling the first molybdenum ring to a first sealing ring, the first sealing ring formed from a ceramic;

a fourth braze ring coupling the second axially facing surface of the flange to a second sealing ring, the second sealing ring formed from low expansion metal and balancing at least said first sealing ring.

* * * * *